United States Patent
Vallauri

[19]

[11] Patent Number: 5,171,940
[45] Date of Patent: Dec. 15, 1992

[54] EXPANDED CABLE JOINT ELASTIC SLEEVES WITH PERMISSIBLE RESIDUAL DEFORMATION AFTER STORAGE

[75] Inventor: Ubaldo Vallauri, Monza, Italy

[73] Assignee: Societa' Cavi Pirelli S.p.A., Milan, Italy

[21] Appl. No.: 589,073

[22] Filed: Sep. 27, 1990

Related U.S. Application Data

[63] Continuation-in-part of Ser. No. 464,370, Jan. 12, 1990, and a continuation-in-part of Ser. No. 508,783, Apr. 12, 1990, and a continuation-in-part of Ser. No. 560,359, Jul. 31, 1990.

[30] Foreign Application Priority Data

Oct. 11, 1989 [IT] Italy ................. 21979 A/89

[51] Int. Cl.⁵ .................... H02G 15/08; H02G 15/18
[52] U.S. Cl. .................... 174/73.1; 174/84 R; 174/93; 174/DIG. 8
[58] Field of Search ............ 174/73.1, 93, 88 C, 174/84 R, DIG. 8; 29/235, 450

[56] References Cited

U.S. PATENT DOCUMENTS

| | | | |
|---|---|---|---|
| 3,515,798 | 6/1970 | Sievert | 174/135 |
| 3,816,640 | 6/1974 | Varner | 174/73.1 |
| 3,990,479 | 11/1976 | Stine et al. | 138/125 |
| 3,992,567 | 11/1976 | Malia | 174/73.1 |
| 4,079,189 | 3/1978 | Troccoli | 174/73.1 |
| 4,238,639 | 12/1980 | Palmieri | 174/73.1 |
| 4,304,616 | 12/1981 | Richardson | 174/73.1 |
| 4,314,093 | 2/1982 | Eldridge et al. | 174/73.1 |
| 4,363,842 | 12/1982 | Nelson | 174/73.1 X |
| 4,383,131 | 5/1983 | Clabburn | 174/73.1 |
| 4,487,994 | 12/1984 | Bahder | 174/73.1 |
| 4,503,105 | 3/1985 | Tomioka | 174/135 X |
| 4,613,533 | 9/1986 | Loomis et al. | 428/36 |
| 4,868,967 | 9/1989 | Holt et al. | 174/135 X |

FOREIGN PATENT DOCUMENTS

| | | |
|---|---|---|
| 0149032 | 7/1985 | European Pat. Off. . |
| 0379056 | 7/1990 | European Pat. Off. . |
| 0415082 | 3/1991 | European Pat. Off. . |
| 3001158 | 7/1980 | Fed. Rep. of Germany . |
| 0049588 | 4/1979 | Japan . |
| 1294665 | 11/1972 | United Kingdom . |
| 1337951 | 11/1973 | United Kingdom . |
| 2046032 | 11/1980 | United Kingdom . |
| 2183935 | 6/1987 | United Kingdom ........ 174/73.1 |

Primary Examiner—Leo P. Picard
Assistant Examiner—Hyung S. Sough
Attorney, Agent, or Firm—Brooks Haidt Haffner & Delahunty

[57] ABSTRACT

A storable covering element for electric cable joints which includes a tubular support on which a multi-layer sleeve is mounted in radially stretched condition, a cable joint with such a sleeve and a sleeve for such use. The sleeve has an inner layer of cross-linked polymeric material which has a temporary residual deformation after storage for at least 24 months at room temperature which is less than such deformation of the layers outwardly thereof and preferably has a modulus of elasticity greater than the modulus of elasticity of the layers outwardly thereof. The outer layers are also made of cross-linked polymeric material, and each layer is bonded to the adjacent layer so that the inner layer will pull the outer layers radially inwardly when the sleeve is applied to a cable joint.

29 Claims, 2 Drawing Sheets

EXPANDED CABLE JOINT ELASTIC SLEEVES WITH PERMISSIBLE RESIDUAL DEFORMATION AFTER STORAGE

RELATED APPLICATIONS

This application is a continuation-in-part of copending applications Ser. No. 07/464,370 filed Jan. 12, 1990, entitled Multi-Layer Elastic Sleeves For Electric Power Cable Joints and Joints Therewith, Ser. No. 07/508,783 filed Apr. 12, 1990, entitled Cable Joint Coverings, Devices for Applying Such Coverings and Joints Obtained Therewith and Ser. No. 07/560,359 filed Jul. 31, 1990, entitled Expanded Cable Joint Elastic Sleeves with Permissible Residual Deformation After Storage, all assigned to the assignee of the present application.

BACKGROUND OF THE INVENTION

The present invention relates to a covering sleeve for cable joints made of compounds of cross-linked polymeric material which can be applied to several different cables having different outer diameters.

In order to provide a junction between electric cable lengths for carrying electrical energy, particularly in the field of medium and high voltages, the cable conductors are uncovered at the ends, that is, devoid of the respective insulating coatings and, if included, the semi-conductive coatings, for the purpose of exposing the conductors thereby allowing their mutual connection. Subsequently, the area without the insulating coating is filled with appropriate materials and then covered with an outer covering so as to restore the required insulating characteristics in the junction area.

For the purpose, a tubular covering element, hereinafter referred to as a sleeve, is fitted over the junction area. The sleeve is made of cross-linked polymeric material consisting of several layers each having specific electrical features, and as a whole, the sleeve is designed to be elastically clamped around the surface of the insulating layer of the connected cables covering the insulating layer itself over a length thereof in the areas contiguous to the conductor junction.

Therefore, the sleeve is radially expanded and maintained under expanded conditions until it is put over the cable junction area. After the sleeve has been put in place, its shrinkage around the cable surface is carried out so that it exerts a pressure thereon capable of ensuring the necessary electric requirements.

In order to keep the sleeve under expanded conditions, it can be made of thermoshrinkable material, i.e., a material which is capable of maintaining the expansion it has received until its shrinkage by heat is caused. However, this technique requires the accomplishment of delicate operations on site for the installation of the sleeve because heating means, such as free flames, are needed in order to achieve the shrinkage of the sleeve itself.

Alternatively, the sleeve may be made of an elastic material and fitted under expanded conditions around a tubular support body which is then removed after the sleeve has been brought to the intended position around the cable junction area, which enables the sleeve to elastically shrink and be clamped around the cable insulating layer.

However, the polymeric materials to be used for the manufacture of sleeves, in which each layer needs particular electrical features well known in the field, generally exhibit, on the discontinuance of the mechanical deformation stress held for a certain period of time, an incomplete elastic return to the original size, that is, the sleeve has an initial temporary residual deformation the degree of which depends, among other things, upon the value of the previously imposed deformation and the temperature and time of stay in the deformed states. Said residual deformation decreases as time goes by and tends to become zero after a certain lapse of time, in the range of some days or months at room temperature ($\leq 30°$ C.).

Due to the fact that after the sleeve has been fitted on the cable junction, it is impossible to wait for a time sufficient to achieve the size recovery which is necessary to the correct clamping of the sleeve, the problem arises of providing a sleeve which, after being stored under expanded conditions, can still be efficiently clamped around the cables by virtue of its elastic features only.

Materials having particular properties of reduced residual deformation could be used for manufacturing the sleeve, but such materials are of difficult formulation because the mechanical characteristics required of them are not normally accompanied by the necessary electrical properties for the different layers so that it becomes difficult to manufacture a sleeve wherein all layers have an elastic behavior exhibiting a reduced residual deformation.

Taking into account the above problem, sleeves of the type described in said patent application Ser. No. 07/464,370 have been manufactured, in which the use of a single sleeve size has been provided for covering cable junctions having different sizes through the employment of covering elements made at the factory and kept in an expanded condition until they are applied.

In said patent application, the problem of providing the sleeve with sufficient expansion to enable it to be fitted over the cable of the greatest diameter in the group of the intended sizes while at the same time enabling it to be efficiently clamped also around the cables of the smallest size in the group has been solved by adopting for the radially outermost sleeve layer only, a material which exhibits a reduced residual deformation on discontinuance of the applied expansion stress, which material is therefore adapted to act on the underlaying layers so that the whole sleeve can efficiently be clamped around the smallest cables in the intended range of sizes.

However, in order to be able to perform its function in an efficient manner, the outer layer must develop an elastic force sufficient to impose the desired shrinkage to the underlying layers, and therefore, it must have a particularly high modulus of elasticity and in addition its thickness must be higher than it would be necessary if only the desired electrical performance of the layer were involved. Furthermore, the material forming the outer layer appears to be comparatively less stressed in the expanded state, relative to the material of the inner layers, for which the use of materials possessing more reduced mechanical qualities is dictated.

BRIEF DESCRIPTION OF THE INVENTION

The present invention has, as one object, the providing of a covering sleeve for electric cable joints which can be prepared at the factory, expanded on a tubular support and stored as such until the moment of use and can be employed for differently sized cables while ensuring an appropriate clamping of the cables without requiring modifications in the sizes of the different layers as established on the basis of the electrical performance required thereof, and which also makes possible the disposing of the material provided with the best mechanical characteristics in the area subjected to the greatest deformation stresses.

In accordance with the present invention, a storable covering element for electric cable joints which can be applied to several cables having different outer diameters, comprises a tubular support and a sleeve stretched over it. The sleeve comprises a plurality of coaxial layers, at least one of which is electrically insulating, made of compounds formed with cross-linked polymeric materials and is fitted over said tubular support in a condition of elastic radial expansion. The sleeve layers are integrally linked or bonded together and can withstand an imposed expansion maintained for at least 24 months at room temperature. The compound of the innermost layer exhibits, in the cross-linked state, an instantaneous residual deformation substantially lower than that of the layers located externally to it.

Preferably, the compound of the innermost layer at the cross-linked state exhibits an instantaneous residual deformation lower than 15% in connection with an imposed expansion of 50%, maintained for at least 24 months at room temperature or, alternatively, for at least 40 days at 65° C.

Conveniently, the compound of the innermost layer has a modulus of elasticity as great as that of the layers located more externally. Preferably, the innermost layer has a radial thickness lower than 25% of the overall thickness of the sleeve and is formed with a compound having a modulus of elasticity as great as 1.5 times the modulus of the layers located externally thereof.

In a preferred embodiment, the compound of the innermost layer has a modulus of elasticity included between 0.5 and 10 MPa and the compounds of the layers located more externally relative to it have a modulus of elasticity in the range of 0.03 to 6 MPa. In a more preferred embodiment, the compound of the innermost layer has a modulus of elasticity included between 1 and 5 MPa and the compounds of the outer layers have a modulus of elasticity in the range of 0.5 to 3 MPa.

The sleeve layers are made of elastomeric materials having chemical affinity therebetween, and preferably are coextruded and/or jointly cross-linked.

A further object of the present invention is an electric cable joint comprising an electrical and mechanical connection between the conductors of two cables and a covering sleeve for the connection itself, fitted over the connection and in contact with the insulating coatings of the cables in a condition of elastic radial expansion. The sleeve is formed with several coaxial layers, at least one of which is an electrically insulating layer, made of compounds of cross-linked polymeric materials. The sleeve layers are integrally linked together and under an imposed expansion maintained for at least 24 months at room temperature, the compound of the innermost layer exhibits, in the cross-linked state, a temporary residual deformation substantially lower than that of the layers located externally to it.

BRIEF DESCRIPTION OF THE DRAWINGS

Other objects and advantages of the present invention will be apparent from the following detailed description of the presently preferred embodiments thereof, which description should be considered in conjunction with the accompanying drawings in which.

DETAILED DESCRIPTION OF PREFERRED EMBODIMENTS

Figure 1:
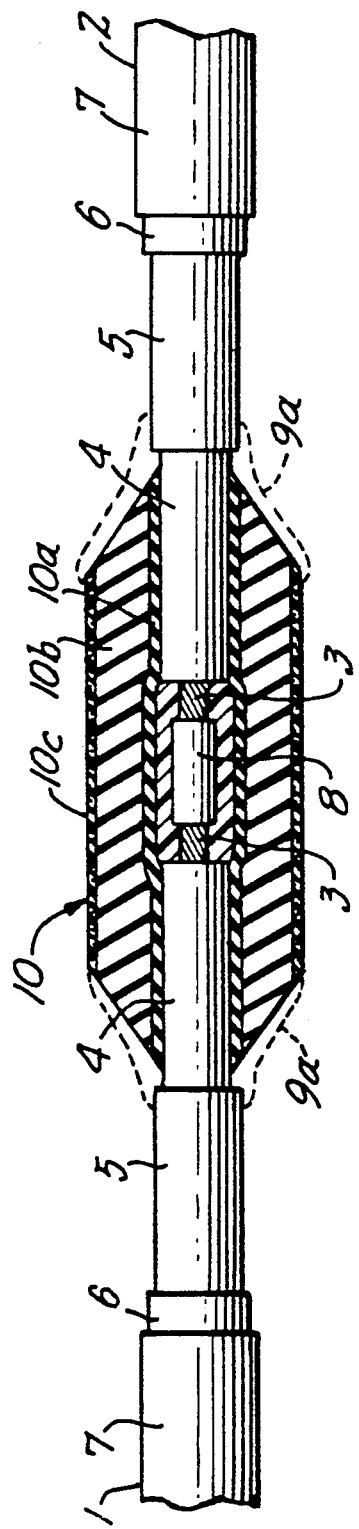
FIG. 1 is a diagrammatic, axial, sectional view of the junction area of two cables having the covering sleeve applied thereto.

As diagrammatically shown in FIG. 1, the junction between two cables 1, 2 is made by disposing the ends of the cables to be joined in a confronting coaxial relation, the layers around the conductors 3 of the cables having been previously removed stepwise so that the conductors 3 are bared over predetermined lengths thereof.

The bared end portions of conductors 3 are electrically and conductively connected to each other by a junction means 8.

Figure 2:
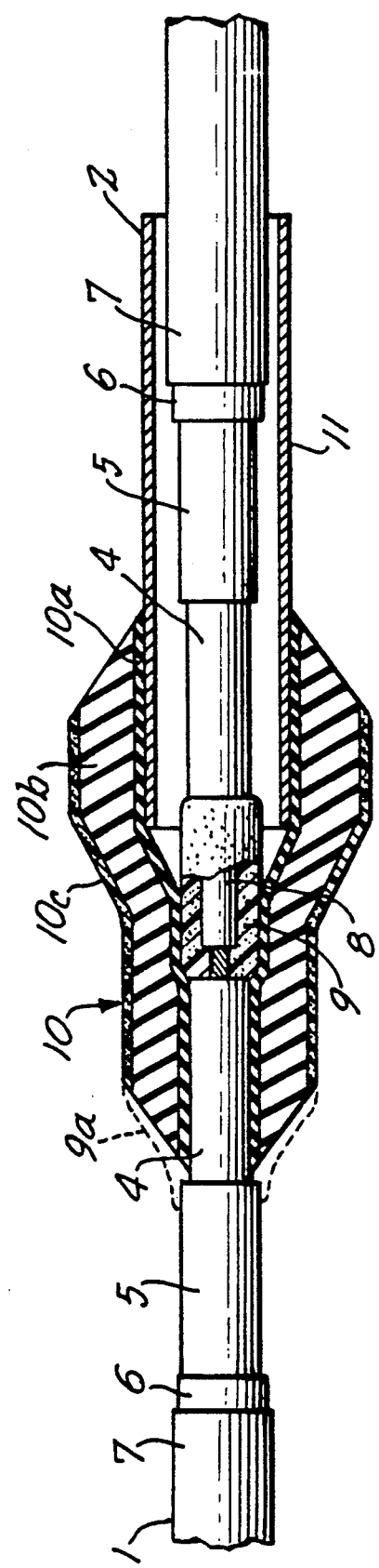
FIG. 2 is an axial sectional view of the junction area of the cables shown in FIG. 1 with the covering sleeve being applied on the cables.

Said electrical junction means 8, diagrammatically shown in FIGS. 1 and 2, is known per se, and it may, for example, consist of a welding, a scarfing element or the like and therefore, will not be herein further described.

After the conductors have been electrically connected to each other, the space corresponding to the lengths where the insulating layer 4 has been removed, is filled with a deformable field-control filler 9, which is also well known in the art. A further conductive means 9a of known type covers the ends of the covering sleeve 10 and restores the armoring continuity, such means 9a being conductively connected to the semiconductive layers 5 of the cable and to the semiconductive layer 10c of the covering sleeve.

For covering the junction area, a sleeve 10 is provided and is made of cross-linked polymeric material. The sleeve 10 is slidably fitted over one of the cables before it is joined to the other cable by the means 8. Once the electrical connection operations have been completed through the junction means 8, and the filler 9 has been applied, the sleeve 10 is brought over the junction area and released in place so as to form a cover completely surrounding the uncovered lengths of the insulating layer 4.

For the purpose of being fitted over the junction area and as shown in FIG. 2, the sleeve 10 is mounted on a tubular support body 11 which keeps the sleeve 10 in a radially expanded condition. The inner diameter of the body 11 is of a size which allows the sleeve itself and the tubular body 11 carrying it to freely slide on the cables, at least on the portion forming the semiconductive layer 5 or, as shown, the outer sheath 7.

In order to enable the sleeve to be put around the junction, the tubular body 11, as diagrammatically shown in FIG. 2, is progressively removed using known techniques, for example, by axial withdrawal, so that the sleeve can elastically shrink around the cable surfaces, ejecting the air from the contact area and adhering to said surfaces, while exerting some pressure thereon in order to ensure a correct distribution of the electric field in the junction area.

Usually for medium voltage cables ($U_m \geq 12$ KV) this pressure must be higher than a minimum value of about 0.1 MPa.

In this case, the sleeve 10 is required to have an inner diameter at rest, that is in the absence of applied stresses, smaller than the outer diameter of the cable insulating layer by an amount giving rise to an elastic deformation of the sleeve corresponding to the desired clamping of said sleeve on the cables. In other words, the bore of the sleeve must have a diameter less than the diameter of the insulating layer 4 of the cables so that when the sleeve 10 engages the layer 4, the sleeve 10 is still in an elastically deformed condition.

The required degree of difference in diameter for developing a certain pressure value on the cable depends upon the elastic deformability of the material forming the sleeve, that is, on its modulus of elasticity E and on its radial thickness. Therefore, these values must be selected so as to comply with the desired pressure as above stated.

Figure 3:
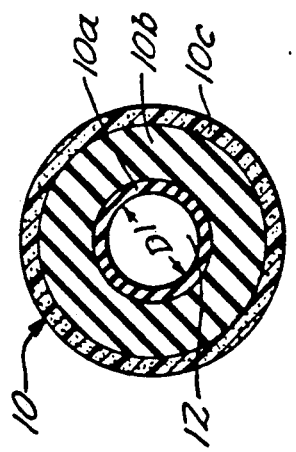
FIG. 3 is a cross-sectional view of a sleeve in accordance with the invention in its unstretched condition.

The structure of a sleeve for medium voltages and of the type adapted to be applied as above stated and as shown in FIGS. 1, 2 in axial section and in FIG. 3 in transverse cross-sectional view, consists of several coaxial layers which, starting from the central bore 12, comprises an inner layer 10a, acting as a voltage divider and made of a material having a high dielectric constant $\epsilon$, an intermediate layer 10b made of insulating material and an outer layer 10c of semiconductive material.

The term "material having a high dielectric constant" means a material having a dielectric constant $\epsilon$ determined according to specifications ASTM D 150 at least equal to 6 and preferably at least equal to 9, whereas the term "insulating material" means a material having a dielectric constant $\epsilon$ according to specifications ASTM D 150 lower than 4 and volume resistivity $> 10^{14}$ Qcm, determined according to the specification ASTM D257.

Figure 4:
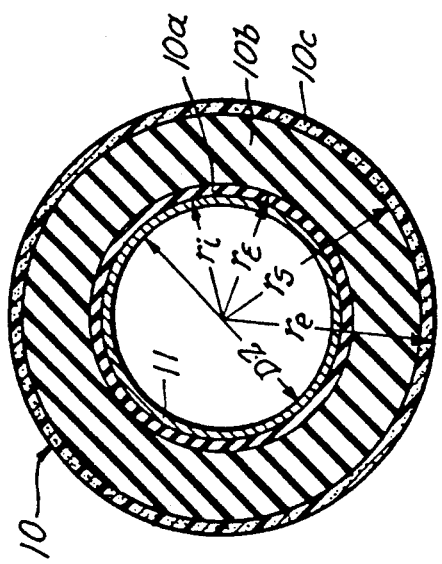
FIG. 4 is a cross-sectional view of the sleeve shown in FIG. 2 after stretching or expansion and disposed on the tubular support.

In order to enable the sleeve to be fitted over the tubular support body 11, it must be radially expanded so that its bore 12 having a diameter $D_1$ at rest, as shown in FIG. 3, will reach the diameter $D_2$ as shown in FIG. 4.

Figure 5:
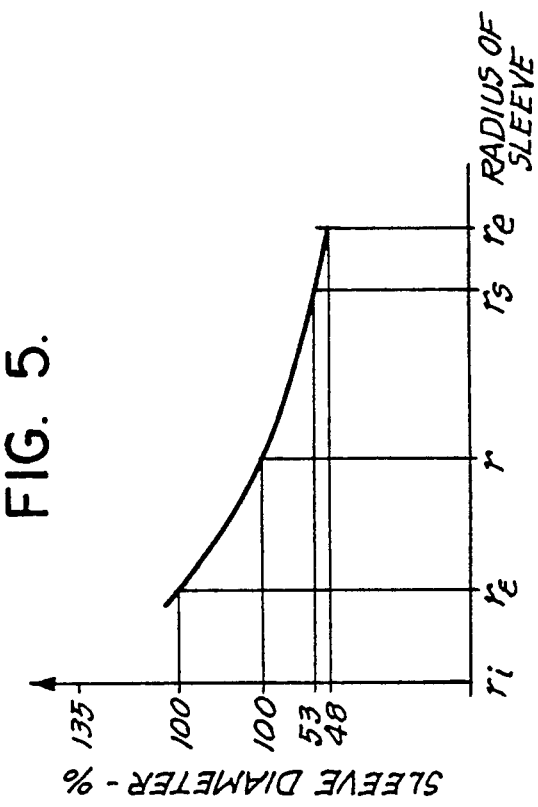
FIG. 5 is a diagram showing the radial development of the percent expansion in the sleeve thickness.

The diagram shown in FIG. 5 represents the development of the percent expansion state in the sleeve thickness at the various radial positions r, emphasizing the expansion values at the inner radius $r_i$, at radius $r_\epsilon$ of the outer surface of the layer 10a having high $\epsilon$, at radius $r_\epsilon$ of the outer surface of the insulating layer 10b and at the outer radius $r_e$ of the sleeve 10.

The diagram shown in FIG. 5 has been determined taking into account an expansion of the sleeve from a starting diameter $D_1 = 17$ mm to a diameter $D_2 = 40$ mm, for a sleeve having an overall wall thickness of 15 mm.

As viewed in the diagram, the development of the percent expansion is of the hyperbolic type. Therefore, it is very high for the areas close to the inner radius $r_i$ of the sleeve, whereas it is remarkably reduced proceeding outwardly.

The materials used for manufacturing the sleeves are cross-linked polymeric materials, consisting of compounds selected on the basis of the required electric characteristics for each layer.

These materials in general do not have a perfectly elastic behavior. In fact, when they are submitted to deformation they exhibit a certain degree of temporary residual deformation which becomes increasingly higher with the increasing of the imposed expansion.

For example, if some tubular sleeves are expanded starting from a given inner diameter and are maintained in the expanded state for a certain period of time, upon release they elastically come back to a greater diameter than the starting one, thereby retaining a deformation which is not immediately eliminated, particularly if the deformed condition has been maintained for a long time, as in the case of the sleeves expanded at the factory and stored under an expanded condition until the moment of use, e.g. for some months. Actually, the residual deformation will decrease either partly or to zero, but it takes very long periods of time for such decrease, i.e. weeks or months.

Since it is desirable to be able to mount the sleeve on the tubular bodies at the factory, under supervised conditions, and keep them in an expanded state on said supports until the moment of use, normally for a period of some months, the problem of the residual deformation is particularly important because this residual deformation can impair the desired clamping of the sleeve around the cables.

According to the invention, in order to enable the sleeve assembly to be applied to the cable junction in compliance with the desired radial-clamping conditions, the innermost layer 10a of the sleeve is made of a material having a reduced degree of residual deformation, lower than that of the overlying layers.

In this way, the inner layer when released after expansion, by virtue of its reduced residual deformation, is capable of elastically resuming a diameter slightly higher than the starting one, which therefore ensures a good clamping on the cables. In addition, it must carry out a pulling action on the layers externally overlying it in order to make the assembly resume its original size, counteracting the residual deformation present in said outer layers.

In particular, the innermost layer, as soon as the tubular support keeping it expanded has been removed, is subjected to a spring back or return force, the amount of which depends on its modulus of elasticity, its thickness and the value of the relative deformation imposed thereon.

When the sleeve 10 is fitted over the support 11 under expanded conditions, the inner layer 10a is in the highest state of deformation with respect to the other sleeve layers. Therefore, upon release, the spring back force acting thereon is the highest of the various layers, the other conditions being equal.

Therefore, the use in this layer 10a of a compound having a low temporary residual deformation and capable of elastically shrinking until the central bore 12 reaches the diameter corresponding to the desired value for being clamped around the cables allows the desired result to be achieved, that is, the return of the whole sleeve to a diameter close to the starting one, causing the other layers to shrink although the inner layer has a relatively reduced thickness and the overlying layers exhibit a higher residual deformation.

In order to achieve the above result, causing a high return force for the inner layer 10a, that is, the one causing the shrinkage of the whole sleeve to the desired degree, the inner layer 10a should preferably have a modulus of elasticity not lower than that of the other layers and, more preferably, assuming that the other layers 10b and 10c have typical sizes based on the required performance from the electrical point of view, the modulus of elasticity of the layer 10a should be higher than 1.5 times the modulus of elasticity of said other layers.

In particular, the modulus of elasticity of the compounds forming the outer layers 10b, 10c can be between 0.03 and 6 MPa, whereas the modulus of the compound forming the inner layer 10a can be in the range of 0.5 to 10 MPa, but at least equal to the modulus of elasticity of the layers 10b and 10c. Preferably, the compound used for the innermost layer has a modulus of elasticity in the range of 1 to 5 MPa and the compounds of the outer layers have a modulus of elasticity between 0.5 and 3 MPa.

As regards the outer layers 10b and 10c, they are in turn submitted to an expansion state which is relatively smaller on the support 11 and therefore the residual deformation of said layers, since it increasingly grows with the increasing of the imposed deformation, is at all events within values which enable it to be resumed by the returning action carried out by the inner layer 10a.

In order that the inner layer 10a of the sleeve should be able to exert its returning action, it must be integrally linked to the external layer immediately overlying it and the latter in turn must be linked to the layer 10c in the same manner so that the layer 10a will be capable of transmitting the necessary tractive action to the outer layers 10b and 10c thereby enabling the clamping of the sleeve around the cables. This condition is easily complied with in the case in which the layers have chemical affinity with respect to one another and are coextruded and/or jointly cross-linked to form the sleeve.

Preferably, when sleeves are sized so as to be used for applications in the field of medium and high voltages, in which the innermost layer has a thickness lower than 25% of the overall wall thickness of the sleeve and it is wished to apply the sleeve to cables of several different diameters selected from a group in which the diameter of the greatest cable is 1.6 times larger than the diameter of the smallest one, the material forming the inner layer 10a is required to have an instantaneous residual deformation lower than 15%, taking into account an imposed deformation of 50% held for a period of 40 days at 65° C. and determined on a flat test piece following the procedure stated by the specification UNI 7321-74.

The stated time and temperature conditions are substantially equivalent to a two years' stay at room temperature, and therefore, such conditions simulate, in an accelerated manner, the actual conditions in which a sleeve expanded at the factory can be at the moment of use and after a storage period, thereby constituting an appropriate reference value for evaluating the elastic behavior of the material.

By way of example, a sleeve in accordance with the invention, adapted to be used on medium voltage cable joints, in a cable size range comprised between a diameter of 20 mm and a diameter of 32 mm for the insulating coating, taking into account the choice of sizes based on the requested electrical performance, requires a thickness of about 2 mm for the innermost layer 10a, a thickness of 7 to 10 mm for the intermediate insulating layer 10b and a thickness of 1 to 3 mm for the outermost layer 10c.

The diameter at rest $D_1$ of the central bore 12 in the sleeve 10 is for example 17 mm and the sleeve expansion on the tubular support 11 makes the sleeve reach a diameter of 40 mm.

An example of a compound made of polymeric material susceptible of cross-linking having the stated characteristics of deformability and strength, to be used for manufacturing the inner layer 10a of a sleeve in accordance with the above example has the following composition expressed in parts by weight:

| | |
|---|---|
| ethylene-propylene-diene terpolymer, for example the one known on the market under the name DUTRAL TER-048 sold by DUTRAL S.p.A. | 100 |
| zinc oxide | 5 |
| lead tetroxide ($Pb_3O_4$) | 5 |
| conductive carbon black, for example the one known on the market under the name HUBER N 990 sold by DEGUSSA S.p.A. | 140 |
| paraffin plasticizer | 40 |
| poly-1,2-dihydro-2,2,4-trimethyl quinoline | 1.5 |
| stearic acid | 1 |
| triallyl cyanidate | 1.5 |
| 40% active cumene hydroperoxide | 10 |

The physical characteristics of the sleeve layer 10a made with said compound, after cross-linking, are as follows:

| | |
|---|---|
| tensile breaking strength | 7 MPa |
| ultimate percent pulling elongation, at room temperature (20° C.) | 610% |
| modulus of elasticity E | 3 MPa |
| temporary residual deformation at the imposed elongation of 50% determined according to UNI specifications 7321-74 on a flat test piece, at 65° C. and after a lapse of time of 960 hours | 10% |
| dielectric constant $\epsilon$ determined according to ASTM specifications D150 | 15 |
| volume resistivity determined according to ASTM specifications D257 | $10^{10}$ Ohm $\times$ cm |

An example of a compound made of a polymeric material susceptible of cross-linking having the stated characteristics, to be used for making the insulating layer 10b in the example illustrated has the following composition expressed in parts by weight:

| | |
|---|---|
| ethylene-propylene copolymer, for example the one known on the market under the name DUTRAL CO-054 SOLD BY DUTRAL S.p.A. | 100 |
| zinc oxide | 5 |
| lead tetroxide ($Pb_3O_4$) | 5 |
| stearic acid | 1 |
| calcined kaolin having a surface treatment with trimethoxyethoxy vinylsilane | 70 |
| trimethoxyethoxy vinylsilane | 1 |
| paraffin plasticizer | 18 |
| poly-1,2-dihydro-2,2,4-trimethyl quinoline | 1.5 |
| mercaptobenzoimidazone | 2 |
| triallyl cyanidate | 1.5 |
| 40% active-bis-(terbutyl peroxy) m p diisopropylbenzene | 5 |

The physical characteristics of the sleeve layer 10b made with said compound, after cross-linking, are as follows:

| | |
|---|---|
| tensile breaking strength | 7 MPa |
| ultimate percent pulling elongation, at room temperature (20° C.) | 560% |
| modulus of elasticity E | 1.5 MPa |
| temporary residual deformation at the imposed elongation of 50% determined according to UNI specifications 7321-74 on a flat test piece, at 65° C. and after a | 28% |

-continued

| | |
|---|---|
| lapse of time of 960 hours | |
| dielectric constant ε determined according to ASTM specifications D150 | 2.8 |
| volume resistivity determined according to ASTM specifications D257 | $10^{15}$ Ohm × cm |

For the outermost semiconductive layer 10c, an appropriate compound has the following composition expressed in parts by weight:

| | |
|---|---|
| ethylene-propylene-diene terpolymer, for example the one known on the market under the name DUTRAL TER-054 sold by DUTRAL S.p.A. | 100 |
| zinc oxide | 5 |
| conductive carbon black, for example the one known on the market under the name VULCAN P sold by CABOT S.p.A. | 80 |
| paraffin plasticizer | 35 |
| poly-1,2-dihydro-2,2,4-trimethyl quinoline | 1.5 |
| stearic acid | 1 |
| triallyl cyanidate | 1.5 |
| 40% active cumene hydroperoxide | 7.5 |

The physical characteristics of the sleeve layer made with said compound, after cross-linking, are as follows:

| | |
|---|---|
| tensile breaking strength | 11 MPa |
| ultimate percent pulling elongation, at room temperature (20° C.) | 520% |
| modulus of elasticity E | 1.5 MPa |
| temporary residual deformation at the imposed elongation of 50% determined according to UNI specifications 7321-74 on a flat test piece, at 65° C. and after a lapse of time of 960 hours | 31% |
| volume resistivity determined according to ASTM specifications D257 | 180 Ohm × cm |

A sleeve having the described structure can therefore be expanded over the tubular support 11 until it reaches an inner diameter of 40 mm and held at the expanded state until the moment of use.

Under these conditions, the inner layer 10a, having a modulus of elasticity E which is twice the modulus of the other outer layers and exhibiting a temporary residual deformation lower than 15% in connection with an expansion of 135%, is capable of ensuring both its elastic return to a diameter of 19 mm so as to accomplish the desired pressure with the cables and a returning action on the other outer layers thereby overcoming the tendency of the latter to stay in a state of residual deformation and bringing about the return of the assembly to the desired diameter.

Therefore, with a sleeve in accordance with the invention, it is possible to obtain an appropriate clamping pressure on cables of a wide range of diameters by using a material having a reduced residual deformation for only one of the sleeve layers and without being obliged, for reasons of mechanical behavior, to modify the choice of the thickness sizes for the sleeve layers. Therefore, such sizes can be determined depending on the electrical requirements only. In addition, the invention enables an optimal exploitation of the elastic properties of the materials used, due to the fact that the material having the best elastic features, which are usually associated with the best strength properties, is located at the position in the sleeve which is subject to the maximum stresses, whereas in less stressed areas, materials having reduced mechanical qualities can be used.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A storable tubular element for covering electrical cable joints and adapted to be applied to a group of cables of several different outer diameters, said element comprising:

a tubular support having an internal diameter at least equal to the largest diameter of the cable in said group and having a predetermined outer diameter;

an elastic sleeve removably mounted on said support in radially stretched condition, said sleeve having an inner diameter in its unstretched condition less than said predetermined outer diameter of said support and less than the diameter of the cable in said group having the smallest diameter and said support having sufficiently rigidity to maintain said sleeve in said radially stretched condition, said sleeve comprising an innermost layer of cross-linked polymeric material and at least one outer layer of cross-linked polymeric material coaxial with said innermost layer, each layer being bonded to the next adjacent layer and each layer reducing in internal diameter to a diameter smaller than the stretched diameter thereof upon removal of said tubular support by reason of the elasticity thereof and without heating thereof, at least one of the layers around said innermost layer being electrically insulating and the material of said innermost layer, in the cross-linked state, having a temporary residual deformation less than the temporary residual deformation of the material of the layers outwardly thereof after said sleeve has been mounted on said support in stretched condition for at least twenty-four months at room temperature and upon removal of said support and the elastic modulus and radial thickness of the material of said innermost layer being selected to cause said innermost layer, upon removal of said support, to apply a predetermined radially inward pressure on the cables in said group to which the sleeve is applied including the cable in said group having the smallest diameter.

2. A storable tubular element as set forth in claim 1 wherein said temporary residual deformation of said innermost layer is less than 15% when said innermost layer has been maintained under an expansion of 50%.

3. A storable tubular element as set forth in claim 2 wherein said temporary residual deformation of said innermost layer is less than 15% when said innermost layer has been maintained under an expansion of 50% for at least 40 days at 65° C.

4. A storable tubular element as set forth in claim 1 wherein said innermost layer has a modulus of elasticity at least as great as the modulus of elasticity of the layers outwardly thereof.

5. A storable tubular element as set forth in claim 4 wherein the radial thickness of said innermost layer is less than 25% of the radial thickness of said sleeve and said innermost layer has a modulus of elasticity at least 1.5 times the modulus of elasticity of the layers outwardly thereof.

6. A storable tubular element as set forth in claim 4 wherein the modulus of elasticity of said innermost layer is in the range from 0.5 MPa to 10 MPa and the modulus of elasticity of the layers outwardly thereof is in the range from 0.03 MPa to 6 MPa.

7. A storable tubular element as set forth in claim 4 wherein the modulus of elasticity of said innermost layer is in the range from 1 MPa to 5 MPa and the modulus of elasticity of the layers outwardly thereof is in the range from 0.5 MPa to 3 MPa.

8. A storable tubular element as set forth in claim 1 wherein each layer is made of an elastomeric material having a chemical affinity with the elastomeric material of the layer adjacent thereto and the layers are co-extruded.

9. A storable tubular element as set forth in claim 1 wherein each layer is made of an elastomeric material having a chemical affinity with the elastomeric material of the layer adjacent thereto and the layers are jointly cross-linked.

10. A storable tubular element as in claim 1 wherein said predetermined radially inward pressure is at least 0.1 MPa.

11. An electric cable joint between two cables, each cable having a conductor encircled by insulation and the conductor of one cable being electrically and mechanically connected at its end to the end of the conductor of the other cable, and an elastic sleeve encircling the connected conductor ends and portions of the insulation of each cable, said sleeve comprising:
an innermost layer of cross-linked polymeric material and at least one outer layer of cross-linked polymeric material coaxial with said innermost layer, each layer being bonded to the next adjacent layer and at least one of the layers around said innermost layer being electrically insulating, said innermost layer and the layers therearound being radially stretched condition with said innermost layer applying a predetermined radially inward pressure to the insulation of each cable and the material of said innermost layer, in the cross-linked state, having a temporary residual deformation less than the temporary residual deformation of the material of the layers outwardly thereof after the materials of the layers have been in stretched condition for at least 24 months at room temperature.

12. A joint as set forth in claim 11 wherein said temporary residual deformation of said innermost layer is less than 15% when said innermost layer has been maintained under an expansion of 50%.

13. A joint as set forth in claim 12 wherein said temporary residual deformation said innermost layer is less than 15% when said innermost layer has been maintained under an expansion of 50% for at least 40 days at 65° C.

14. A joint as set forth in claim 11 wherein said innermost layer has a modulus of elasticity at least as great as the modulus of elasticity of the layers outwardly thereof.

15. A joint as set forth in claim 14 wherein the radial thickness of said innermost layer is less than 25% of the radial thickness of said sleeve and said innermost layer has a modulus of elasticity at least 1.5 times the modulus of elasticity of the layers outwardly thereof.

16. A joint as set forth in claim 14 wherein the modulus of elasticity of said innermost layer is in the range from 0.5 MPa to 10 MPa and the modulus of elasticity of the layers outwardly thereof is in the range from 0.03 MPa to 6 MPa.

17. A joint as set forth in claim 14 wherein the modulus of elasticity of said innermost layer is in the range of 1 MPa to 5 MPa and the modulus of elasticity of the layers outwardly thereof is in the range from 0.5 MPa to 6 MPa.

18. A joint as set forth in claim 11 wherein each layer is made of an elastomeric material having a chemical affinity with the elastomeric material of the layer adjacent thereto and the layers are co-extruded.

19. A joint as set forth in claim 11 wherein each layer is made of an elastomeric material having a chemical affinity with the elastomeric material of the layer adjacent thereto and the layers are jointly cross-linked.

20. A storable tubular element as in claim 11 wherein said predetermined radially inward pressure is at least 0.1 MPa.

21. An elastic sleeve for covering an electric cable joint, said sleeve comprising:
an innermost layer of cross-linked polymeric material;
at least one outer layer of cross-linked polymeric material coaxial with said innermost layer, each layer being bonded to the next adjacent layer and at least one of the layers around said innermost layer being electrically insulating, the material of said innermost layer, in the cross-linked state, having a temporary residual deformation less than the temporary residual deformation of the material of the layers outwardly thereof after the material of the layers have been in stretched condition for at least 24 months at room temperature.

22. A sleeve as set forth in claim 21 wherein said temporary residual deformation of said innermost layer is less than 15% when said innermost layer has been maintained under an expansion of 50%.

23. A sleeve as set forth in claim 22 wherein said temporary residual deformation of said innermost layer is less than 15% when said innermost layer has been maintained under an expansion of 50% for at least 40 days at 65° C.

24. A sleeve as set forth in claim 21 wherein said innermost layer has a modulus of elasticity at least as great as the modulus of elasticity of the layers outwardly thereof.

25. A sleeve as set forth in claim 24 wherein the radial thickness of said innermost layer is less than 25% of the radial thickness of said sleeve and said innermost layer has a modulus of elasticity at least 1.5 times the modulus of elasticity of the layers outwardly thereof.

26. A sleeve as, set forth in claim 24 wherein the modulus of elasticity of said innermost layer is in the range from 0.5 MPa to 10 MPa and the modulus of elasticity of the layers outwardly thereof is in the range from 0.03 MPa to 6 MPa.

27. A sleeve as set forth in claim 24 wherein the modulus of elasticity of said innermost layer is in the range from 1 MPa to 5 MPa and the modulus of elasticity of the layers outwardly thereof is in the range from 0.5 MPa to 3 MPa.

28. A sleeve as set forth in claim 21 wherein each layer is made of an elastomeric material having a chemical affinity with the elastomeric material of the layer adjacent thereto and the layers are co-extruded.

29. A sleeve as set forth in claim 21 wherein each layer is made of an elastomeric material having a chemical affinity with the elastomeric material of the layer adjacent thereto and the layers are jointly cross-linked.

* * * * *

UNITED STATES PATENT AND TRADEMARK OFFICE
CERTIFICATE OF CORRECTION

PATENT NO. : 5,171,940

DATED : December 15, 1992

INVENTOR(S) : Vallauri

It is certified that error appears in the above-identified patent and that said Letters Patent is hereby corrected as shown below:

```
In the Abstract, line 11, after "of" insert --a--;
col. 5, line 46, "r₍" should read --rs;
col. 10, line 25, "sufficiently" should read
     --sufficient--;
col. 10, lines 43 and 44, delete "upon removal of
     said support and";
col. 11, line 53, after "deformation" insert --of--;
col. 12, line 16, change "storable" to --joint--;
col. 12, line 51, after "as" the comma (,) should
     be deleted.
```

Signed and Sealed this

Second Day of November, 1993

*Attest:*

BRUCE LEHMAN

*Attesting Officer*     Commissioner of Patents and Trademarks